United States Patent Office 3,123,648
Patented Mar. 3, 1964

3,123,648
2-(SUBSTITUTED-BENZYL)-1,3-PROPANE-
DIHALIDES
Raymond G. Wilkinson, Montvale, N.J., and Thomas L.
Fields, Pearl River, N.Y., assignors to American
Cyanamid Company, New York, N.Y., a corporation
of Maine
No Drawing. Original application July 15, 1958, Ser.
No. 748,589, now Patent No. 3,013,069, dated Dec. 12,
1961. Divided and this application Apr. 25, 1961, Ser.
No. 105,280
4 Claims. (Cl. 260—612)

This invention relates to new organic compounds and, more particularly, is concerned with novel substituted phenylethanes which may be represented by the following general formula:

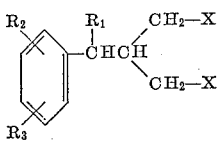

wherein X is halogen, $R_1$ is hydrogen, hydroxy, lower alkyl or a lower alkoxy radical, and $R_2$ and $R_3$ are hydrogen, halogen, hydroxy, lower alkyl, lower alkoxy or an aralkoxy radical. Suitable lower alkyl and lower alkoxy groups contemplated by the present invention are those having up to about 6 carbon atoms. Suitable aralkoxy groups are benzyloxy, phenthoxy, etc. Halogen is exemplified by bromine, chlorine and iodine.

The novel compounds of the present invention are useful intermediates for the preparation of 2-carboxymethyl and 2-formylmethyl-4-oxo-tetrahydronaphthalenes which form the subject matter of the copending application of Raymond G. Wilkinson and Andrew S. Kende, Serial No. 821,093, filed June 18, 1959. For example as shown in the copending application, the 2-benzyl-1,3-dihalopropanes of the present invention may be converted to the corresponding dinitriles by reaction with an alkali metal cyanide in a conventional manner. The hydrolysis of the dinitrile to the corresponding β-benzylglutaric acid is preferably accomplished in a liquid solution of base, e.g., an alkali metal hydroxide. The β-benzylglutaric acid may then be ring-closed to the corresponding tetrahydro-4-oxo-naphthalene-2-acetic acid with a suitable condensing agent such as polyphosphoric acid or a mineral acid such as sulfuric acid. The tetrahydro-4-oxo-naphthalene-2-acetic acid is then converted to the corresponding acyl halide in a conventional manner. This intermediate acyl halide may then be converted to the corresponding aldehyde by a suitable reduction process. The new compounds of this invention are also useful in the synthesis of polyoxygenated cyclic compounds.

The new compounds of this invention may be prepared from the corresponding benzyl bromide according to the following reaction scheme:

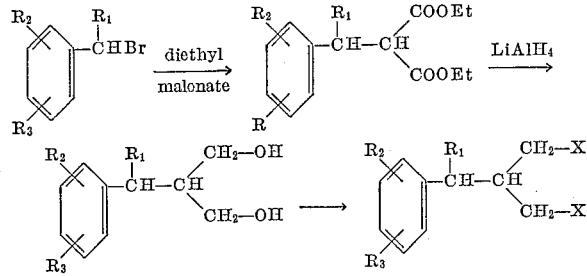

wherein X, $R_1$, $R_2$ and $R_3$ are as hereinbefore defined.

The reaction conditions are not especially critical. The reaction of the benzyl bromide with diethyl malonate salt is preferably carried out in a refluxing solution of a lower alkanol. The benzyl malonic ester so formed is reduced with lithium aluminum hydride in a conventional manner. The bis-halo intermediates may be prepared from the intermediate 1,3-propanediols as shown in the examples which follow.

The invention will be described in greater detail in conjunction with the following specific examples.

Example 1

94.0 grams (0.6 mole) of 2-chloro-5-methoxytoluene [Peratoner and Condorelli, Gazz. Chim. Ital. 28, I, 213 (1898)] are added to 600 milliliters of reagent grade carbon tetrachloride, 117.4 grams (0.66 mole) of N-bromo-succinimide and 0.1 gram benzoyl peroxide. The reaction mixture is stirred at reflux temperature and additional 0.1 gram quantities of benzoyl peroxides are added after 1½ and 18 hours. After 21 hours the volume of solvent is reduced to approximately 250 milliliters and the succinimide filtered off. The filtrate is washed with three 200 milliliter portions of water, dried over anhydrous $MgSO_4$ and filtered. The solvent is removed under reduced pressure and the residual oil crystallized on standing overnight. Yield of crude 2-chloro-5-methoxybenzyl bromide, 131.0 grams. The pure compound crystallizes from (20°–40°) petroleum ether as white needles, melting point 55.5°–57.5° C.

Example 2

131.0 grams (0.55 mole) of 2-chloro-5-methoxybenzyl bromide in 300 milliliters of absolute ethanol is added over a 1 hour period to a refluxing solution of diethyl malonate (145 grams, 0.9 mole) and sodium methylate (32.4 gram, 0.6 mole) in absolute ethanol. The refluxing is continued for an additional 2½ hours and the reaction mixture concentrated to approximately half volume. The sodium bromide is filtered off and the filtrate acidified by the slow addition of acetic acid. The remainder of the solvent is removed under reduced pressure and the residual oil taken up in ether. The ethereal solution is washed with three 200 milliliter portions of water and dried over anhydrous $MgSO_4$. The ether and excess diethyl malonate are removed under water pump pressure. Diethyl-2-chloro-5-methoxybenzyl-malonate is collected at 155°–168° C./0.4–0.8 mm.; yield: 90.0 grams; $n_D^{25}$ 1.5030. Overall yield based on 2-chloro-5-methoxy-toluene is 48%.

Example 3

A solution of 105 grams (0.33 mole) of diethyl-2-chloro-5-methoxybenzylmalonate in 360 milliliters of dry ether is added slowly with stirring to 19.5 grams (0.513 mole) of $LiAlH_4$ dissolved in 700 milliliters of dry ether. The mixture is stirred and refluxed for 4½ hours before decomposing the excess hydride with ethyl acetate. The mixture is acidified with 6 N HCl, washed with water, and allowed to stand over 70 milliliters of 5 N NaOH over the weekend. The ether layer is washed with $H_2O$, dried over $MgSO_4$, and concentrated to an almost colorless oil which turns to a mushy solid on seeding. Distillation at 0.1 mm. gives 64 grams (84%) of a colorless oil at 160°–175° C. with a small forerun at 130°–160° C. On seeding, the main fraction gives white crystals of 2-(2'-chloro-5'-methoxybenzyl)-1,3-propanediol, melting point 41°–46° C.

Example 4

To a solution of 23.06 grams (0.100 mole) of 2-(2'-chloro-5'-methoxybenzyl)-1,3-propanediol in 100 milliliters of dry benzene is added 24.0 milliliters (0.35 mole) of thionyl chloride. This mixture is allowed to stand at room temperature for 18 hours and is then refluxed for 6 hours. Methanol is added slowly to react with the excess thionyl chloride. The reaction mixture is washed with 2 N NaOH until alkaline, then with water until neutral, dried, and concentrated to yield 2-(2'-chloro-5'-methoxybenzyl)-1,3-dichloropropane.

To this crude oil is added a solution of 45 grams (0.34 mole) of NaI in 350 milliliters of acetone. The mixture is refluxed for 5 days with intermittent filtration removing 9.9 grams of NaCl (0.17 mole). The mixture is then concentrated to a mush, water added, and the product extracted with ether. Evaporation of the ether gives an almost black oil from which only small yields of crude product can be obtained by crystallization from ethanol. However, evaporative distillation at 0.1 mm. gives a yellow forerun at about 130° C., and a yellow gum from 130° to 150° C., which crystallizes readily from ethanol to give 16.2 grams of white needles M.P. 67°–69° C. Additional material is recovered by redistillation of the forerun and the residues yielding 7.2 grams of material melting from 58° to 68° C. Total yield of 2-(2'-chloro-5'-methoxybenzyl)-1,3-diiodopropane, 23.4 grams (52%). Recrystallization from ethanol raises the melting point to 68°–69.5° C.

*Example 5*

2-(2'-chloro-5'-methoxybenzyl)-1,3-dibromopropane is prepared from 11.81 grams (51.2 mmoles) of 2-(2'-chloro-5'-methoxybenzyl)-1,3-propanediol in 25 milliliters of reagent benzene by the addition of 2.4 milliliters (25.2 mmoles) of phosphorus tribromide and one drop of pyridine and refluxing the mixture for 40 minutes. The benzene solution is washed with water, dried over anhydrous magnesium sulfate and concentrated to yield 2-(2'-chloro-5'-methoxybenzyl)-1,3-dibromopropane.

This application is a division of our copending application Serial No. 748,589, filed July 15, 1958, and now Patent No. 3,013,069.

What is claimed is:

1. A compound of the formula:

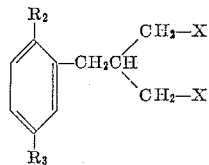

wherein X and $R_2$ are each selected from the group consisting of chlorine, bromine and iodine, and $R_3$ is lower alkoxy.

2. 2-(2'-chloro-5' - methoxybenzyl) - 1,3 - dichloropropane.

3. 2-(2'-chloro-5'-methoxybenzyl)-1,3-diiodopropane.

4. 2-(2'-chloro-5' - methoxybenzyl) - 1,3 - dibromopropane.

References Cited in the file of this patent

UNITED STATES PATENTS 2,576,311     Schlesinger et al. _____ Nov. 27, 1951

OTHER REFERENCES

Wagner et al.: Synthetic Organic Chemistry (1953), pp. 91 and 92.

Brewster: Organic Chemistry (1949), p. 332.